US006470457B1

(12) United States Patent
Brewer et al.

(10) Patent No.: US 6,470,457 B1
(45) Date of Patent: Oct. 22, 2002

(54) LOCAL PERMANENT STORAGE IN NETWORK COMPUTER

(75) Inventors: James A. Brewer, Leander, TX (US); Sanjay Gupta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,366

(22) Filed: Dec. 14, 1998

(51) Int. Cl.$^7$ ................................................ G06F 1/32
(52) U.S. Cl. ........................................ 713/324; 713/2
(58) Field of Search ........................... 713/300–340, 713/1, 2, 100; 710/8–19

(56) References Cited

U.S. PATENT DOCUMENTS

| | | | | |
|---|---|---|---|---|
| 4,941,841 A | * | 7/1990 | Darden et al. | 361/685 |
| 5,349,643 A | * | 9/1994 | Cox et al. | 380/25 |
| 5,404,527 A | * | 4/1995 | Irwin et al. | 709/222 |
| 5,612,852 A | * | 3/1997 | Leverault et al. | 361/687 |
| 5,694,600 A | * | 12/1997 | Khenson et al. | 709/321 |
| 5,872,968 A | * | 2/1999 | Knox et al. | 713/2 |
| 5,918,039 A | * | 6/1999 | Buswell et al. | 395/527 |
| 5,974,547 A | * | 10/1999 | Klimenko | 713/2 |
| 5,978,912 A | * | 11/1999 | Rakavy et al. | 713/2 |
| 6,175,918 B1 | * | 1/2001 | Shimizu | 713/1 |

\* cited by examiner

Primary Examiner—Sumati Lefkowitz

(74) *Attorney, Agent, or Firm*—Joseph P. Lally; Casimer K. Salys; J. Bruce Schelkopf

(57) ABSTRACT

A network computer including, a chassis, a power supply affixed to an interior surface of the chassis, a motherboard powered by the power supply, the motherboard including a clock generator, a boot code storage device, a processor, and a system memory, and a network interface suitable for interfacing the network computer to a server computer via a network. The network computer lacks a disk drive, but includes local permanent storage such as a compact flash card. Preferably, the network computer includes one or more peripheral devices connected to a peripheral bus of the computer. In the preferred embodiment, the network interface provides is an Ethernet compliant connection with an RJ45 connector. In one embodiment, the power supply powers the motherboard via a single power plane. In one embodiment, the network computer includes disk drive facilities for receiving a disk drive. The invention further contemplates a method of testing a network computer including connecting a disk based storage device to a network computer that lacks a disk based storage device but includes local permanent storage, such as a compact flash card. A disk based operating system is then loaded on the network computer via the disk based storage device. A test suite supported by the disk based operating system is then loaded and executed on the network computer to verify its functionality. In one embodiment, the method further includes similarly installing the disk based storage device in each of a plurality of network computers, whereby a single disk based storage device is used to verify each a plurality of network computers.

12 Claims, 7 Drawing Sheets

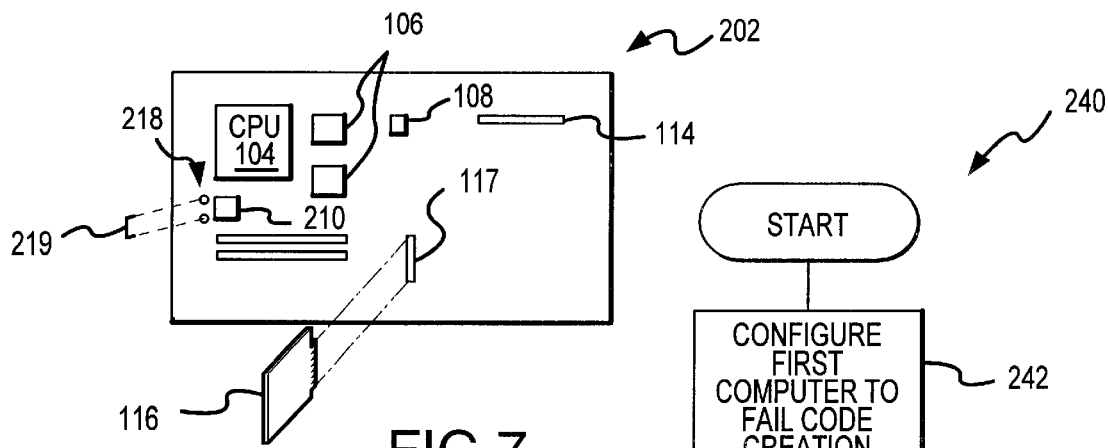
FIG.7
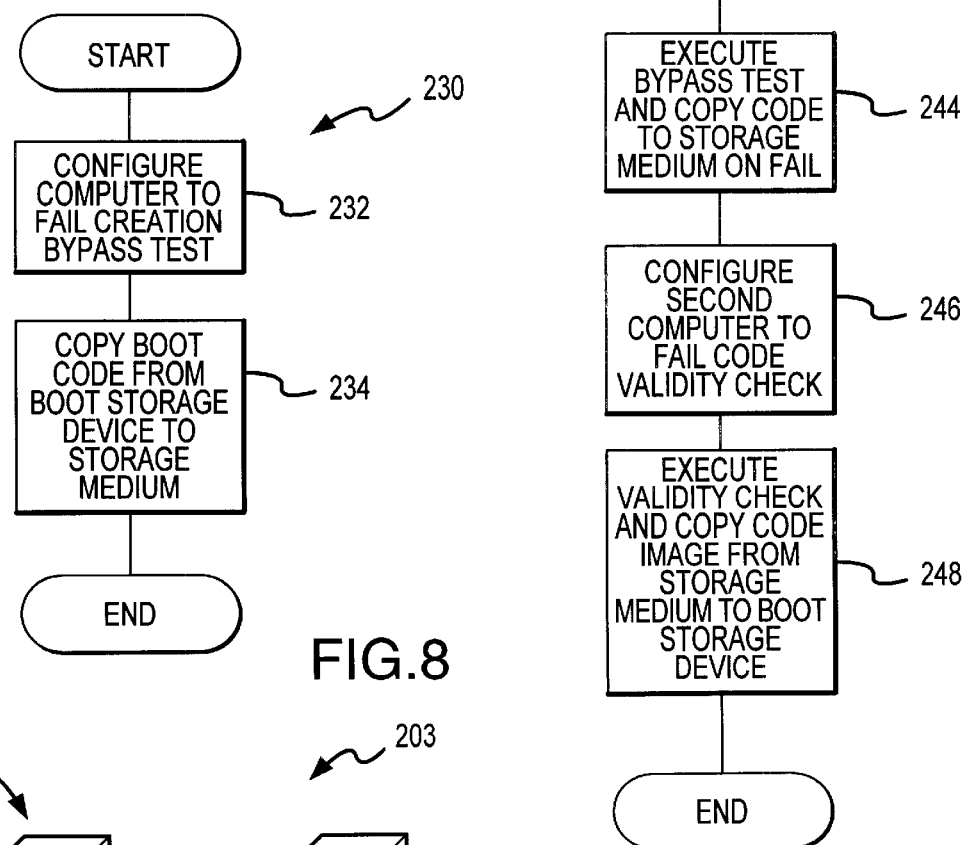
FIG.8
FIG.9
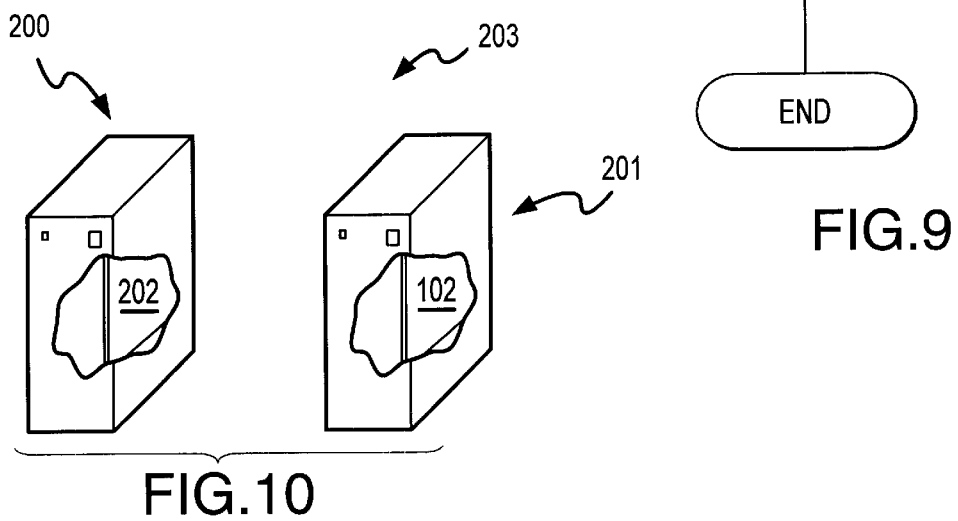
FIG.10

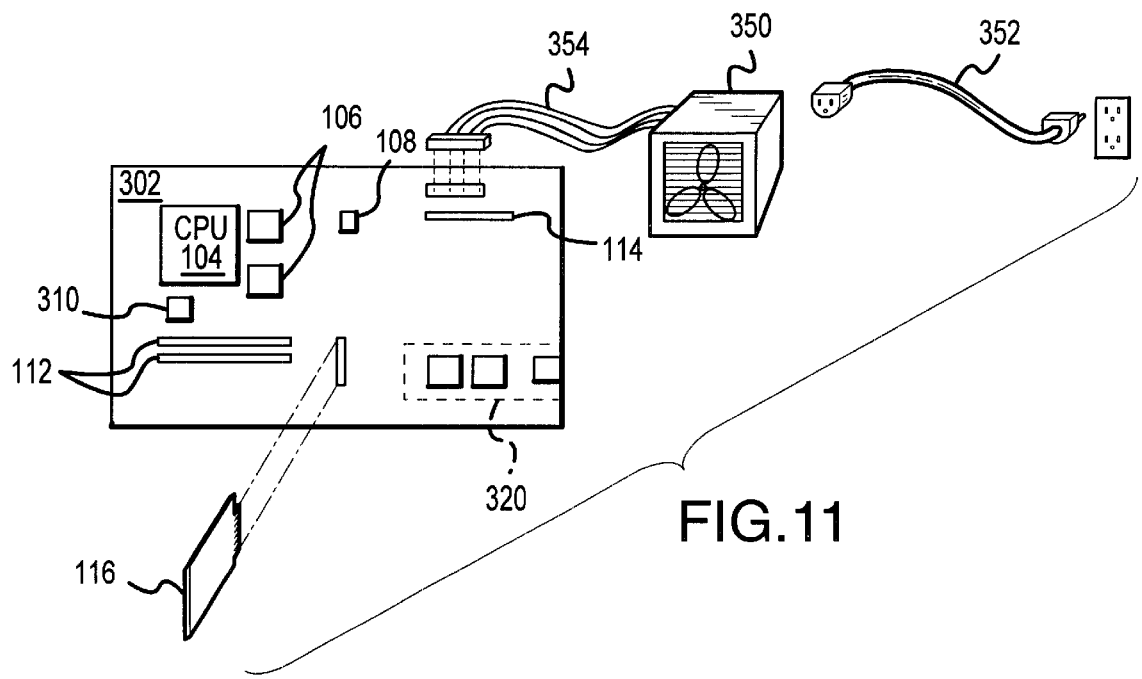
FIG.11
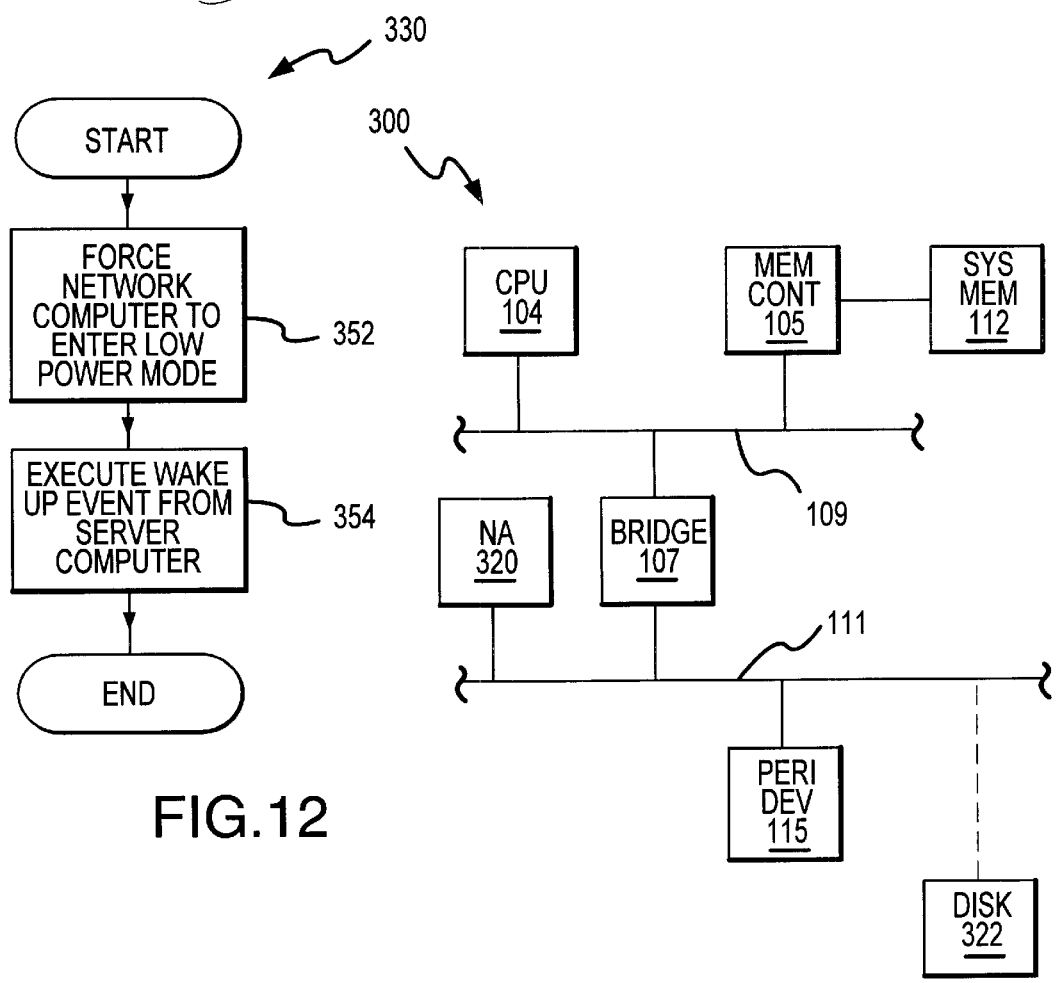
FIG.12
FIG.13

LOCAL PERMANENT STORAGE IN NETWORK COMPUTER

CROSS REFERENCE TO RELATED APPLICATIONS

The present invention is related to the subject matter of the following U.S. Patent applications: Aguilar, Gupta, and Stafford, Boot Code Verification and Recovery, Ser. No. 09/211,367; Aguilar, Gupta, and Stafford, Creating Boot Code Image on a Storage Medium, Ser. No. 09/211,368; Aguilar, Gorrell, Gupta, and Stafford, Low Power Mode Computer with Simplified Power Supply, Ser. No. 09/211,371 and Aguilar and Gupta, Network Connector for Reduced EMI Effects, Ser. No. 09/211,372, all filed on the filing date of this application.

BACKGROUND

1. Field of the Present Invention

The present invention relates generally to the field of microprocessor based computers and more specifically to improving the reliability, flexibility, and power consumption in network computers and other limited resource computers.

2. History of Related Art

The increasing number of computing applications for which a local area network provides a desirable solution has focused increased attention on maximizing network value by carefully controlling the implementation of resources on each computer in the network. In the past, local area networks were frequently designed by interconnecting two or more personal computers, possibly in combination with a large capacity, centralized server machine. The wide spread availability and acceptance of disk based operating system software that eliminated much of the design overhead associated with implementing a local area network greatly contributed to the proliferation of networks comprised of a two or more essentially stand alone machines. Despite the ease with which such networks can be implemented, these networks are not designed to maximize value to the end user because these networks fail to distribute resources in an optimal fashion. More specifically, networks comprised simply of a collection of stand alone machines unnecessarily duplicate resources that can be offered via the network and centralized in one or more network servers. Attempts to address this concern by simply stripping resources from each network computer have resulted in network machines that lack desirable flexibility and features. Examples of such attempts include modifications or simplifications to the power supply of stand alone machines and the elimination of local permanent storage such as disk based devices. Unfortunately, the drawbacks resulting from such attempts to reduce the cost and eliminate unnecessary repetitiveness from network computers overwhelms the advantages achieved. The simplification of a conventional power supply, for example, has typically resulted in a computer incapable of implementing a conventional low power mode while elimination of disk based media from machines severely limits the software applications available to operate on such machines. Accordingly, it is desirable to introduce various improvements and features into computers, designed specifically for use in a network environment to achieve a machine that reduces cost and eliminates unnecessary redundancy in network resources without suffering a noticeable decrease in reliability, flexibility, and performance.

SUMMARY OF THE INVENTION

The problems raised above are in large part addressed by a network computer according to the present invention that facilitates local recovery of network machines, low cost implementation of permanent local storage, improved reliability through a reduction in the network computer's susceptibility to EMI effects, as well as additional benefits discussed in greater detail below. The invention combines the savings achieved by minimizing network computer resources while offsetting the major drawbacks that occur in machines from which resources have been simply removed.

Broadly speaking, a first application of the invention contemplates a boot code storage device configured with computer instructions for executing a boot code validity check in response to a boot event to facilitate local recovery of a computer such as a network computer. In response to the boot event, such as powering up a computer in which the boot code storage device is located, an image of a boot code is copied from a first storage medium to the boot code storage device if the validity check is negative. Remaining portions of the boot code including a start up sequence are executed if the validity check is positive. In one embodiment, the boot code validity check determines the presence or absence of a boot code jumper in a motherboard to which the boot code storage device is connected. In the preferred embodiment, the boot code storage device comprises a flash memory device, preferably including a plurality of sectors. In the preferred embodiment, the boot code validity check is part of a boot block of the boot code residing in a first sector of the flash memory device. The boot block and boot code reside in contiguous memory of the boot code storage device in one implementation. The first storage medium from which the boot code is copied, in one embodiment, is a compact flash card configured with an image of the boot code.

The first application further contemplates a method of respond to a computer boot event in which a boot code validity check is executed. An image of a boot code is then copied from a first storage medium to a boot code storage device of the computer if the validity check is negative. Remaining portions of the boot code, preferably including a start up sequence, are executed if the validity check is positive. The boot event may comprise a power up of the computer or a LAN wake up event. The validity check preferably includes determining if a boot code jumper is present on the computer's motherboard. In the preferred embodiment, the boot code validity check is executed as part of a boot block that forms a portion of the boot code residing in a first sector of the boot code storage device, such as a flash memory device.

The first application of the invention still further contemplates a method of restoring a network computer in which an operator or user configures the computer to fail a boot code validity check, such as by inserting a jumper into a boot code jumper block of the computer's motherboard. A boot event is then executed, such as by powering on the computer, to initiate the validity check. In response to failing the validity check, an image of a boot code is copied into a boot code storage device of the computer from a first storage medium. In an embodiment in which the first storage medium is a compact flash card, the method permits local recovery of a computer that does not have a hard drive or other disk based storage medium.

A second application of the invention contemplates a method of creating a boot code image in which a computer is configured to fail a boot code creation bypass test prior to executing the bypass test. When the bypass test is subsequently executed, an image of a boot code stored in a boot code storage device is copied to a first storage medium in response to failing the bypass test. Preferably, the computer is configured to fail the bypass test by inserting at least one jumper in a motherboard of the computer. In this embodiment, the absence or presence of the at least one bypass jumper determines the outcome of the bypass test. In one embodiment, the boot code creation bypass test is executed in response to a boot event, such as a system power on or reset. In the preferred embodiment, the bypass test comprises a portion of a boot block portion of the boot code. In one embodiment, the boot code is stored to a compact flash card in response to the failure of the bypass test. A flash memory device including a plurality of sectors is used as the boot code storage device. In one embodiment, the boot block and boot code creation bypass test reside in a first sector of the flash memory device while the remaining portions of the boot code including a start up sequence reside in subsequent sectors.

The second application of the invention further contemplates a boot code storage device configured with instructions for executing a boot code creation bypass test in response to a boot event. If the bypass test fails, the boot code executes a routine that copies an image of a boot code from the boot code storage device to a first storage medium, such as the compact flash card indicated previously. If the bypass test passes, the boot code jumps around the boot block and the copy routine and executes a start up sequence to bring the computer to a predetermined initial state. In embodiments in which the boot code storage device is a flash memory device, the flash memory device preferably includes a plurality of sectors, where the boot block resides in the first sector.

The second application of the invention further contemplates a method of restoring a computer network. A first network computer is configured to fail a boot code creation bypass test. The bypass test is then executed and, in response to failing the bypass test, an image of a boot code is copied from a boot code storage device of the first network computer to a first storage medium. A second network computer is then configured to fail a boot code validity check and the validity check executed on the second computer. In response to failing the validity check, an image of the boot code is then copied from the first storage medium to a boot code storage device of the second network computer. The configuring of the first network computer comprises inserting at least one boot code creation jumper in a motherboard of the first network computer, while the configuring of the second network computer comprises inserting at least one boot code validity jumper in a motherboard of the second network computer.

A third application of the present invention contemplates a network computer. The computer includes a motherboard powered by a power supply via a single power supply plane, a clock generator, a processor, and a system memory attached to the motherboard; and a network interface preferably integrated into the motherboard. The network computer is configured to assume a low power state in response to a low power event. The computer is further configured to transition from the low power state to a full power state in response to a wake up event. The wake up event may comprise a LAN wake up in the form of a command issued by a server computer coupled to the network computer via a network. In this way, the power mode of the network computer is remotely manageable by the server computer. In one embodiment, the network computer lacks a disk based storage device, but includes local permanent storage comprising a compact flash card. Preferably, the network computer's clock generator is configured to produce a clock signal for the processor when the network computer is in the full power mode, and further configured to produce no clock signal in the low power mode. In one embodiment, the network computer further includes at least one peripheral device coupled to the processor via a peripheral bus, such as a PCI bus. In this embodiment, the computer is preferably configured to transition each peripheral device on the peripheral bus to a power management mode when the network computer enters low power mode. A preferred embodiment of the invention includes a computer with a full power mode power consumption of less than approximately 65 watts and a low power mode maximum power consumption of less than approximately 15 watts. In one embodiment, the low power event includes simply pushing an on/off button of the network computer. Similarly the wake up event may include pushing the on/off button a second time. The wake up event may be a LAN wake up event in which a wake up signal is received via the network interface, or a "wake on ring" event in which the wake up signal is received via a modem connection to the computer.

The third application of the present invention further contemplates a computer network, including a network computer and a server computer. The network computer includes a motherboard powered by a power supply via a single power supply plane, a clock generator, a processor, and a system memory attached to the motherboard, and a network interface that is preferably integrated into the motherboard. The network computer is configured to assume a low power state in response to a low power event and further configured to transition from the low power state to a full power state in response to a wake up event. The wake up event may be a LAN wake up signal issued by a server computer coupled to the network computer via a network medium. The server computer is interfaced to the network computer via the network and preferably configured to issue the wake up signal to the network computer. In one embodiment, the network computer is characterized by the lack of a disk based storage device, and the inclusion of local permanent storage in the form of a compact flash card. In one embodiment the local permanent storage of the server computer includes a disk based storage device and may further include a compact flash card. In the preferred embodiment, the network medium comprises cable or twisted wires. Alternatively, the network is wireless. Preferably, the low power event invokes a routine that halts the network computer clock generator and places peripheral devices attached to peripheral busses of the network computer into a power management mode. The wake up event preferably executes a reset of the peripheral busses and the clock generator.

The third application of the present invention still further contemplates a method of managing power consumption in a computer network in which a network computer including a motherboard powered by a power supply via a single power plane is forced to assume a low power mode in response to a low power event. A wake up event, such as a LAN wakeup signal issued by a server computer of the network, or a modem signal from a modem device of the network computer is then executed to transition the network computer from the low power state to a full power state. The low power event may comprise simply pushing an on/off button of the network computer. Preferably, the low power state of the network computer comprises a state in which a clock generator of the network computer is halted.

A fourth application of the present invention contemplates a network computer including, a chassis, a power supply affixed to an interior surface of the chassis, a motherboard powered by the power supply, the motherboard including a clock generator, a boot code storage device, a processor, and a system memory and a network interface suitable for interfacing the network computer to a server computer via a network. The network computer lacks a disk drive, but includes local permanent storage such as a compact flash card. Preferably, the network computer includes one or more peripheral devices connected to a peripheral bus of the computer. In the preferred embodiment, the network interface includes one or more devices and associated circuitry integrated into the motherboard and includes an RJ45 connector. In one embodiment, the power supply powers the motherboard via a single power plane and the computer consumes less than approximately 65 watts in a full power mode and less than approximately 15 watts in a low power mode. Preferably, the boot code storage device comprises a flash memory device configured with boot code processor instructions. In one embodiment, the network computer includes disk drive facilities for receiving a disk drive unit such that a disk drive may be installed in the network computer.

The fourth application of the invention further contemplates a method of testing a network computer including connecting a disk based storage device to a network computer that lacks a disk based storage device but includes local permanent storage, such as a compact flash card. A disk based operating system, such as OS/2®, Windows 98®, or Windows NT®, is then loaded on the network computer via the disk based storage device. A test suite supported by the disk based operating system on the network computer is then loaded and executed on the network computer to verify its functionality. The disk based storage device is then removed. In one embodiment, the method further includes similarly installing the disk based storage device in each of a plurality of network computers comprising the network, whereby a single such disk based storage device may be used to verify each of the plurality of network computers.

The fourth application of the invention still further contemplates a computer network, including at least one network computer comprised of a chassis, a power supply affixed to an interior surface of the chassis, a motherboard powered by the power supply, and a network interface preferably integrated into the motherboard and suitable for interfacing the network computer to a server computer via a network medium. The network computer lacks a disk based storage device, but includes local permanent storage such as a compact flash card. The network further includes a server computer interfaced to the network computer via the network medium. The server computer includes a chassis, a power supply attached to an interior of the server computer chassis, a motherboard, and local permanent storage including a disk based storage device. In one embodiment, the network computer power supply powers the motherboard via a single power plane and consumes less than approximately 65 watts of power. Preferably, the network interface is integrated into the motherboard and provides for an Ethernet connection to the network including an RJ45 connector. The network medium may comprise cable, twisted wire, or the atmosphere in a wireless embodiment of the network. The server computer may include additional local permanent storage in the form of a compact flash card.

A fifth application of the invention emphasizes a connector for use in a network interface to reduce EMI effects in a high speed network. The connector includes, a connector housing, preferably formed of a conductive material such as aluminum. The housing includes a receptacle face that defines a receptacle opening. A receptacle of the connector is attached to an interior surface of the housing and suitable for receiving a terminus of the network cable through the receptacle opening. The connector has a connector circuit including a cable port coupled to the network cable and an interface port coupled to the network interface. The housing defines at least one conduit adapted for receiving a light pipe. Preferably, the network interface is integrated into the motherboard a provides for an Ethernet connection. In one embodiment, the connector circuit includes magnetic components. In the preferred embodiment, the connector comprises an RJ45 connector. In an embodiment advantageous in physically smaller computers such as network computers, a maximum dimension of the housing is less than approximately one inch. In one embodiment, the connector further includes a light pipe received within the light pipe conduit. In this embodiment, a first end of the light pipe terminates at the receptacle face of the housing adjacent to the receptacle opening.

The fifth application of the invention is directed to a motherboard with an integrated network interface. The motherboard includes a printed circuit board, a connector affixed to the printed circuit board, an LED attached to the printed circuit board, and a light pipe. The LED indicates status of the network interface. The connector includes a housing and a receptacle within the housing configured to receive a network cable terminus through a receptacle opening in a receptacle face of the housing. The housing defines at least one conduit adapted to receive a light pipe. The light pipe is received within the light pipe conduit such that a first end of the light pipe terminates at a light pipe opening in the receptacle face of the housing and a second end of the light pipe terminates proximal to the LED. In this configuration, light produced by the LED proximal to the second end of the light pipe is observable at the first end of the LED. The interface is preferably provides for an Ethernet connection and the connector, such as an RJ45 connector, includes a connector circuit that has magnetic components wherein the separation of the LED and the magnetic components improves EMI susceptibility of the connector.

The fifth application of the invention further contemplates a network computer including a chassis, a motherboard including an integrated network interface. The motherboard is attached to an interior of the chassis and powered by a power supply within the chassis. The motherboard includes a processor and preferably includes at least one expansion slot. The interface preferably provides for an Ethernet connection and includes a connector, an LED and a light pipe. The connector, such as an RJ45 connector, is affixed to the motherboard and includes a housing that defines at least one conduit adapted to receive a light pipe. The LED is attached to the motherboard and configured to indicate status of the network interface. The light pipe is received within the light pipe conduit with a first end of the light pipe terminating at a light pipe opening in the receptacle face of the housing and a second end of the light pipe terminating proximal to the LED such that light produced by the LED is observable at the first end of the LED.

BRIEF DESCRIPTION OF THE DRAWINGS

Other objects and advantages of the invention will become apparent upon reading the following detailed description and upon reference to the accompanying drawings in which:

FIG. 7 is a diagram of a motherboard according to a second application of the present invention;

FIG. 8 is a flow diagram of a method according to a second application of the present invention;

FIG. 9 is a flow diagram of a method according to a second application of the invention;

FIG. 10 is a drawing a computer network including a network computer according to FIG. 7;

FIG. 11 is drawing of a motherboard according to a third application of the present invention;

FIG. 12 is a flow diagram of a method according to a third application of the invention;

FIG. 13 is a simplified block diagram of a network computer according to a fourth application of the present invention;

Figure 1:
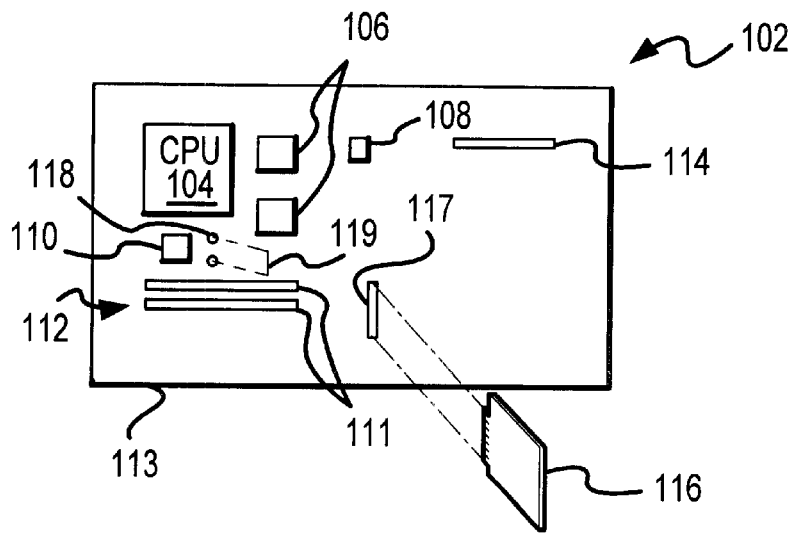
FIG. 1 is a motherboard according to a first application of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning to the drawings, FIGS. 1 through 6 depict a first application of the present invention emphasizing restoring the boot code of a computer and minimizing the risk of corrupting, deleting, or otherwise rendering inoperable the computer's boot code. This first application of the present invention is advantageous in a variety of computing environments including the computing environment typically associated with a network computer. As used throughout this disclosure, a network computer refers to a computer designed to be implemented as a node on a computer network and characterized by its low initial and operating costs, which are achieved by minimizing or reducing network computer facilities that may be adequately provided via the computer network. Taking advantage of centralized resources results in a lower overall network cost thereby making network solutions feasible in a greater variety of applications.

Referring now to FIG. 1, a motherboard 102 and a computer 100 (shown in FIG. 6) incorporating motherboard 102 are presented according to a first application of the present invention. Motherboard 102 includes a processor 104, a core chip set 106, a clock generator 108, and a boot code storage device 110, all attached to and interconnected by a printed circuit board 113 as will be familiar to those in the field of microprocessor based computer systems. Processor 104 may be implemented with any of a variety of RISC or CISC microprocessors and the present invention is not intended to constrain the designer's choice of implementation. Moreover, although the embodiment of motherboard 106 indicates a single processor 104, the invention contemplates multi-processor machines comprising two or more processors 104 coupled via a host bus (also referred to as a processor or local bus). Motherboard 102 further includes a core chip 106. Core chip set 106 suitably provides various support facilities required to enable processor 104 to communicate information to and from various peripheral components of computer 100. The embodiment of core chip set 106 depicted in FIG. 1 indicates two devices, but it should be recognized that alternative implementations are possible, including implementations in which essentially all core chip functions are integrated into a single device or incorporated directly into processor 104 itself. Core chip set 106 typically includes a memory controller for coupling processor 104 to a system memory 112, a bus bridge for interfacing the host bus to one or more peripheral busses and peripheral devices connected to motherboard 102 via one or more expansion slots 114, as well as interrupt handling and bus arbitration facilities. Processor 104 and core chip set 106 are clocked by a clock signal generated by a clock generator 108. FIG. 1 indicates a system memory 112 by one or more connectors 111 adapted to received any of a variety of commercially available memory modules. (The modules themselves are eliminated from FIG. 1 for the sake of clarity.) System memory 112, as will be appreciated by those skilled in computer design, is most preferably implemented with DRAM memory modules desirable for their combination of capacity, speed, reliability, and cost.

Figures 2, 3:
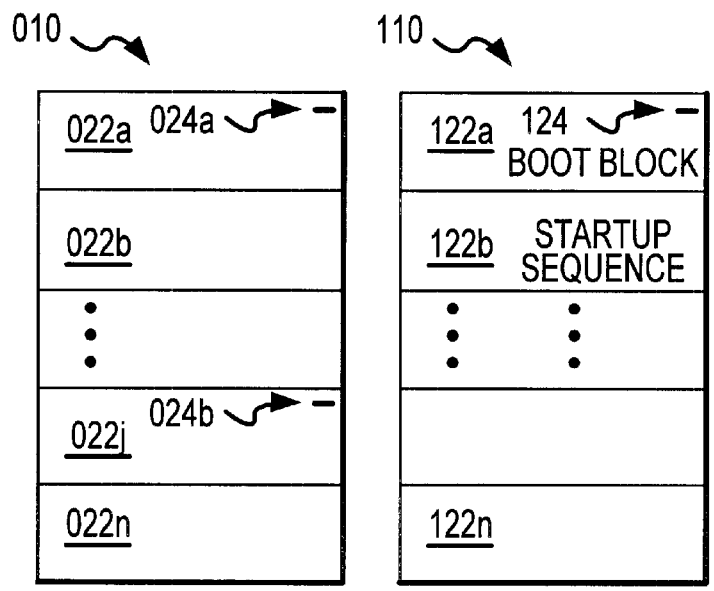
FIG. 2 is a diagram of a flash memory device according to the prior art.
FIG. 3 is a diagram of a flash memory according to the present invention.

Motherboard 102 of computer 100 includes a boot code storage device 110. Boot code storage device provides an essentially permanent set of computer instructions executable by processor 104 and designed to transition computer 100 and system memory 112 to a predetermined state after a system boot or power on. Boot code storage device 110 is preferably implemented as a non-volatile memory such as an EEPROM or a flash memory device. Whereas computer instructions and data in system memory 112 are lost when power is lost or significantly interrupted, instructions stored in boot code memory device 110 remain intact unless a specific sequence of electrical signals is applied to boot code storage device 110 to program or erase the code contained therein. In a presently preferred embodiment of computer 100, boot code storage device 110 is a flash memory device. Turning to FIGS. 2 and 3, representations of flash memory devices are presented according to the prior art and the present invention respectively. In both the prior art of FIG. 2 and the present invention of FIG. 3, flash memory devices are typically characterized by an internal organization in which the flash memory device array is divided into a plurality of sectors. Accordingly, prior art flash memory device 010 includes sectors 012a, 012b, ... 012n while flash memory device 110 includes sectors 122a, 122b, ... 122n.

Each sector of a flash memory device includes a plurality of flash memory cells. Unlike dynamic RAM devices, in which cells are read, written with "1", or written with "0" at essentially the same speed or cycle time, flash memory devices are characterized by relatively long and often asymmetrical write cycles (in which the time required to write a "1" or "program" a cell differs from the time required to write a "0" or "erase" the cell). Thus, flash memory devices are ideally suited for applications in which computer instructions are written or modified relatively infrequently. Occasionally, however, it is desirable or necessary to reprogram the contents of boot code storage device 110, such as when the boot code is revised to incorporate various improvements or when the contents of boot code storage device 110 are erased or otherwise corrupted.

Flash memory devices typically must be completely erased prior to reprogramming. To facilitate the erase process, flash memories are designed such that an entire sector is erased in one erase cycle. This characteristic of flash memory devices is the source of a potentially significant problem that can arise when the boot code is revised or updated. If power is lost during boot code reprogramming, the computer will be unable to fully execute its boot program upon restart thereby rendering the computer essentially non-functional. This problem is addressed by storing a piece of code, referred to herein as the boot block, as part of the boot code in the boot code storage device. The boot block typically contains code just sufficient to permit the computer to reprogram its boot code storage device with the boot code. To prevent the boot block itself from being erased or corrupted in conventionally designed machines, the boot bock is typically stored in a high order sector of the boot block storage device. Referring to FIG. 2, boot block storage device 010 according to the prior art includes first and second entry points, 024a and 024b, stored in sectors 022a and 022j respectively. During normal operation, execution of the boot code initiates from first entry point 024a in first sector 022a and proceeds from there. If the boot code becomes corrupted such that the computer is unable to execute its boot code, conventional computers include facilities to invert a high order address line to induce entry into boot code storage device 010 at second entry point 024b, where the boot block is executed to restore or update the boot code.

Computer 100 of the present invention is typically lacking in facilities to invert an address line upon discovering a boot code error. While eliminating this ability reduces the overall cost of computer 100, it renders the dual entry point boot code solution described in the preceding discussion unworkable. The present invention proposes a solution to this dilemma by including a boot code validity test early in the boot code routine and by simultaneously providing facilities by which computer 100 can be locally configured to fail the boot code validity test. If the validity test fails, the boot block is executed to reprogram the boot code storage device. If, on the other hand, the validity test passes, the boot block is bypassed and the remaining portions of the boot code, including the start up sequence for computer 100, are executed. In the embodiment depicted in FIG. 1, the ability to locally configure computer 100 to fail the validity test is achieved through the use of jumper block 118 and jumper 119. More specifically, the boot code validity test incorporated into the boot block of boot code storage device 110 verifies the absence or presence of jumper 119 in jumper block 118 of motherboard 102. If the validity test detects the presence of jumper 119 in jumper block 118, the validity test fails and the boot block is executed to reprogram boot code storage device 110. If the validity test detects the absence of jumper 119 in jumper block 118, the validity test passes and the code executes a jump around the boot block to the remaining portions of the boot code including the start up sequence of computer 100, which may be stored in contiguous memory with the boot block. In one embodiment, the validity test and the rest of the boot block are stored in first sector 122a of boot code storage device 110, while the startup sequence and remaining portions of the boot code are stored in second sector 122b and higher. Assuming that the code implementing the boot code validity test and the boot block rarely, if ever, require revision and that the boot block is capable of being stored within a single sector 122 of boot code storage device 110, the susceptibility of computer 100 to a catastrophic power off sequence during a reprogramming of boot code storage device 110 is minimized because it will be essentially unnecessary to ever intentionally erase first sector 122a containing the boot block. By prohibiting or making unnecessary changes to first sector 122a of boot code storage device 110, computer 100 is substantially immunized from a situation in which the boot block itself is altered or erased. Thus, the impact of a worst case scenario in which power is lost during boot code reprogramming does not result in the loss of the boot block. Recovering or restoring computer 100 is then accomplished by configuring computer 100 to fail the boot code validity test, such as by inserting jumper 119 in jumper block 118, and rebooting computer 100.

The boot block itself includes sufficient code to reprogram boot code storage device 110. The reprogramming of storage device 110 is preferably accomplished by copying an image of the boot code from a storage medium and programming the image into storage device 110 (also referred to as "reflashing"). In one embodiment, such as an embodiment in which computer 100 is implemented as a cost effective network computer in which no permanent storage in the form of a disk based device is present, a suitable storage medium from which the boot code image is copied may comprise a compact flash card 116 configured with an image of the boot code of computer system 100. Compact flash cards, as their name implies, contain a flash memory device in a package configuration suitable for insertion into a connector through which appropriate data, address, and control information is communicated. In one embodiment of the invention, motherboard 102 includes a connector 117 suitable for receiving and communicating with a compact flash card 116. In other embodiments of computer 100, the storage medium from which the boot code image is copied to boot code storage device 110 may include a conventional disk based medium residing on computer 100 or on another computer interfaced to computer 100 via a computer network. Regardless of the storage medium on which the boot code image is saved, the boot block of the boot code contains instructions sufficient to execute a reflash of boot code storage device 110 with the boot code image stored on storage medium (such as compact flash card 116).

Figure 4:
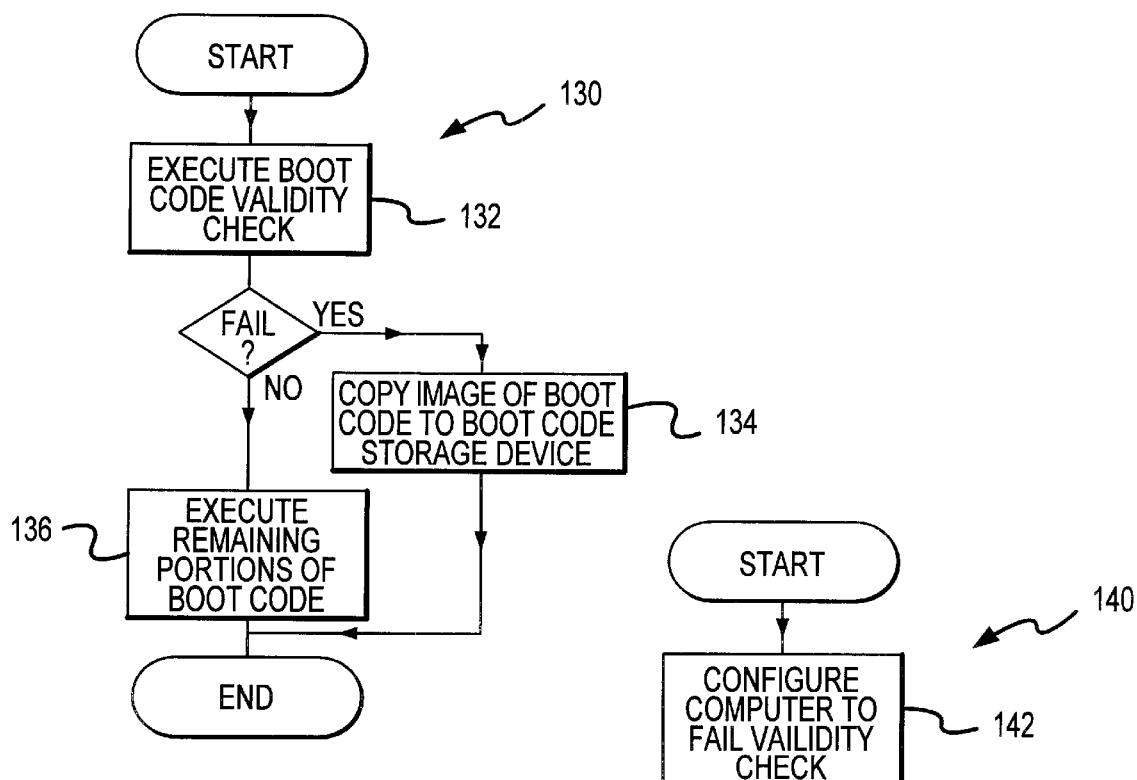
FIG. 4 is a flow diagram of a method according to a first application of the present invention.
Figure 5:
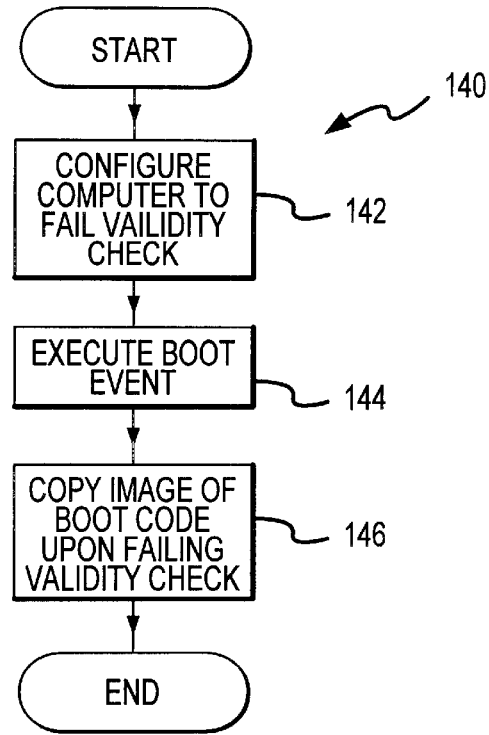
FIG. 5 is a flow diagram of a method according to a first application of the invention.
Figure 6:
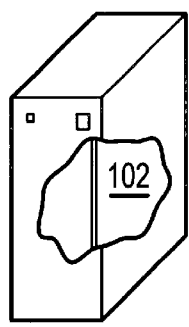
FIG. 6 is a cut away view of a computer according to the first application of the present invention.
Figure 14:
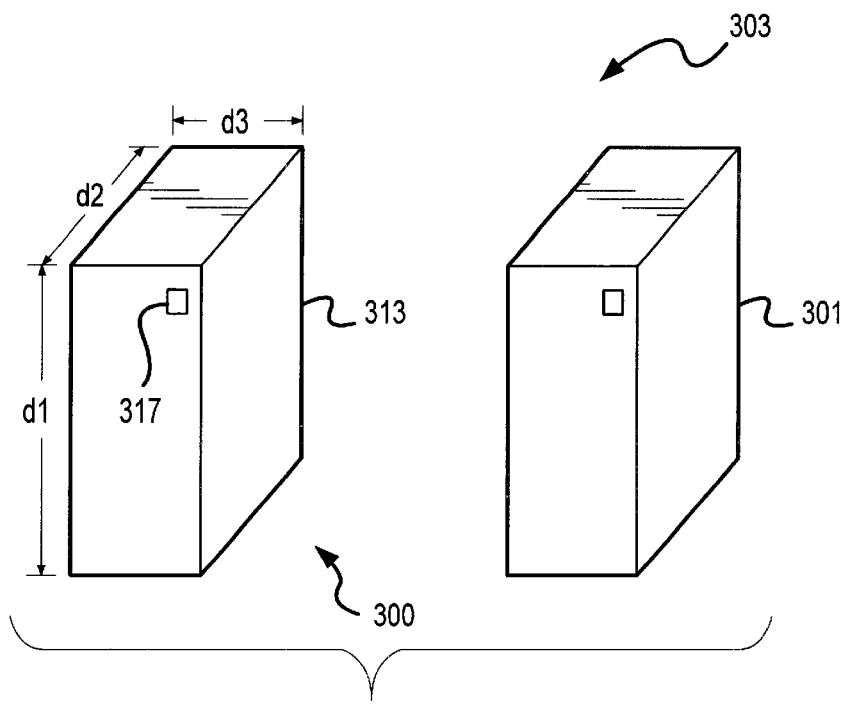
FIG. 14 is a depiction of a network according to the present invention.
Figure 15:
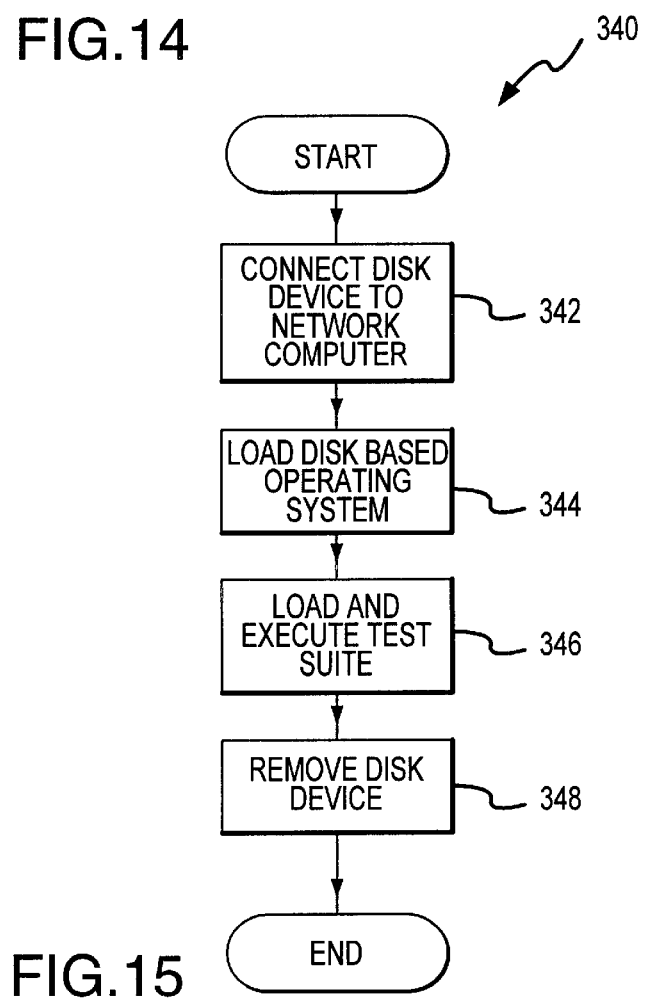
FIG. 15 is a flow diagram according to a fourth application of the invention.

The first application of the present invention thus contemplates a method 130, depicted in the flow diagram of FIG. 4, of responding to a computer boot event such as a power up sequence. A boot code validity check is executed in step 132. If the boot code validity check fails, the boot block copies an image of the boot code to boot code storage device 110 in step 134. If the boot code validity check passes, the remaining portions of the boot code including the startup sequence of computer 100 are executed in step 136. The boot code validity check includes testing a jumper block 118 of motherboard 102 for the presence of jumper 119. By providing a computer 100 with the capability to execute method 130 of FIG. 4, the present invention further provides for a method 140, depicted in the flow diagram of FIG. 5, of restoring a computer. Initially, a computer is configured to fail a boot code validity check in step 142 through the use of a jumper as discussed previously or through other suitable means. A boot event such as a power on or restart is then executed in step 144 to initiate execution of a boot block, which includes a boot code validity check. After the boot code validity check fails, an image of the boot code is copied from a suitable storage means, such as a compact flash card, to the boot code storage device in step 146.

Turning now to FIGS. 7 through 10, a second application of the invention is presented. This second application emphasizes the ability to create locally a boot code image on a suitable storage medium for subsequent use in recovering the computer as discussed in the preceding paragraphs. Accordingly, FIG. 7 depicts a motherboard 202 and computer 200 (shown in FIG. 10) that includes motherboard 202 according to the second application of the present invention. Motherboard 202 includes a processor 104, a core chip set 106, a clock generator 108, a system memory 112 and one or more expansion slots 114 all essentially as presented previously with respect to motherboard 102 of FIG. 1. Motherboard 202 further includes a boot code storage device 210 configured with computer code to transition computer 200 and system memory 112 from an off state to a known initial condition in response to a boot event. Similar to boot code storage device 110 of FIG. 1, boot code storage device 210 of FIG. 7 is preferably implemented as a flash memory device or other suitable non-volatile storage device and is configured with boot code instructions including a boot block preferably stored in a first sector (not depicted) of storage device 210 while and remaining portions of the boot code including a start up sequence are stored in remaining sectors of storage device 210.

The boot block is preferably stored in the base sector of storage device 210 and includes a boot code image creation bypass test that is executed each time the boot block of storage device 210 is executed. If the bypass test fails, the boot block copies an image of the boot code from boot code storage device 210 to an appropriate storage medium. In one embodiment, the appropriate storage medium may comprise a compact flash card 116 connected to and interfaced with motherboard 202 via a connector 117. Other embodiments may store the boot code image on a disk based medium located either on computer 200 or on another computer interfaced to computer 200 via a computer network. In the preferred embodiment, motherboard 202 includes a jumper block 218 and the image creation bypass test determines whether a jumper 219 is inserted in jumper block 218. If the bypass test detects the presence of jumper 219 in jumper block 219, a copy of the boot code stored in storage device 210 is transferred to the appropriate storage medium.

In this manner, the second application of the invention contemplates a method 230, depicted in the flow diagram of FIG. 8., of creating a boot code image. In a first step 232, a computer 200 is locally configured to fail a boot code creation bypass test. After the creation bypass test is executed, such as during a restart of computer 200, a copy of the boot code is transferred in step 234 from the boot code storage device to the appropriate storage medium such as compact flash card 116. Utilizing computer 200 and method 230 in conjunction with method 140; the present invention includes a method of restoring a network computer. FIG. 10 presents a simplified diagram of a computer network 203 including a first computer 200 and a second computer 201.

The method 240, presented in the flow diagram of FIG. 10 includes a first step 242 in which a computer such as computer 200 is configured to fail a boot code creation bypass test, such as by inserting a jumper in an appropriate jumper block of motherboard 202 of computer 200. After executing the bypass test, which is typically stored within a boot block of boot code storage device 210 and executed during a restart of computer 200, computer 200 responds to the failure of the bypass test by copying, in step 244, an image of the boot code to an appropriate storage medium such as the compact flash card described. Thereafter a second computer 201, which has been determined to have a defective or corrupted boot code and which includes a motherboard 102 as shown and described with respect to FIG. 1 previously, is configured to fail a code validity test, in step 246, such as by inserting a jumper into a jumper block 118 of motherboard 102 of computer 201. The storage medium on which the boot code image was saved from boot code storage device 210 of first computer 200 is then made available to second computer 201. In embodiments in which the storage medium is a compact flash card, the appropriate flash card 116 is simply transferred from connector 117 of first computer 200 and inserted into the corresponding connector of second computer 201. When the boot code validity check of second computer 201 is subsequently executed by the initiation of a boot sequence or similar event, the failure of the validity test results in the copying, in step 248, of the boot code from the storage medium to the boot code storage device 110 of computer 201. It will be appreciated that method 240 of the invention advantageously provides for restoring one or more computers on a computer network, such as computer network 203 including first computer 200 and second computer 201, with a single copy of the boot code stored on a transportable storage medium. The storage medium may suitably comprise a compact flash card, a disk based storage medium, or other suitable media.

Turning now to FIGS. 11 through 15, third and fourth applications of the present invention are depicted emphasizing expanding the flexibility of network computers by introducing a low power mode and local permanent storage to network computers lacking in facilities utilized by conventional computers to implement these desirable functions. FIG. 11 depicts a motherboard 302 of a network computer 300 (show in FIG. 14) according to the invention. Motherboard 302 is suitably attached to an interior surface of a chassis 313 and includes, like the previously discussed motherboards 102 and 202, a processor 104, core chip set 106, a clock generator 108, and a system memory indicated by reference numeral 112. In one embodiment, motherboard 302 further includes a network interface 320 discussed in greater detail below. Motherboard 302 is powered by a power supply 350, which receives conventional 120 V AC signal as its input via power cord 352 and delivers power signals to motherboard 302 via power harness 354. It will be appreciated that conventional computers utilize power supplies such as the ATX type power supply familiar in the microprocessor based computer industry. These power supplies are designed to deliver power to a plurality of power planes of the computer's motherboard. A power harness of typical microprocessor based computers may routinely include 16 or more wires to deliver ground, 5 V, 12 V, and 3.3 V signals. Conventional power supplies may supply multiple "copies" of a given voltage for powering multiple power planes of the computer. Multiple power planes enable simple implementation of low power modes in conventional computer systems. Subsystems and peripheral devices which are desired to be powered down in a low power mode of a conventional computer are connected to one or more power planes that are cutoff in low power mode. Devices that are desired to be operational or functional in low power mode are connected to one or more power planes that are left powered during low power mode. When an event requiring a wake up of a conventional computer is detected by a device that remained functional in low power mode, the device can initiate a system reset, which permits each of the power planes to deliver power to its corresponding devices thereby waking up or powering up the entire system or any combination of subsystems restricted only by the number of power planes available.

Despite the flexibility and ease of implementation offered by conventionally designed, multiple plane motherboards and power supplies, these advantages are achieved only at the cost of a significantly increased motherboard, power supply, and ultimately overall system cost. To combat the cost of conventionally powered computers, the network computers contemplated herein such as network computer 300 preferably use a power supply 350 that powers a motherboard such as motherboard 302 via a single power plane. Constraining power supply 350 and motherboard 302 to a single power plane design lowers system cost, but necessitates a different approach to achieving a low power mode. Because computer 300 includes only a single power plane, low power mode cannot be achieved by simply cutting off power to the power plane. To achieve the desirable benefits associated with low power operation, computer 300 incorporates a software driven power down sequence that is activated in response to a low power event. In one embodiment, a low power sequence is initiated by pushing a power or on/off button 317 situated on the chassis of computer 300. In the preferred embodiment, the low power sequence includes routines to transition peripheral devices residing on peripheral busses of computer 300 to a power management mode and to kill the signal generated by clock generation 108.

FIG. 13 depicts a block diagram of one embodiment of computer 300 including processor 104 and a memory controller 105 coupled to a host bus 109. A bus bridge 107 provides a path between host bridge 109 and peripheral bus 111, to which a network interface 320 and a peripheral device 115, such as a graphics interface, are coupled. In an exemplary embodiment, peripheral bus 111 comprises any of a variety of industry standard peripheral busses including the PCI bus, the ISA bus, or the EISA bus. Upon detecting a low power event, such as the pushing of on/off button 317 or the passage of a prescribed time period without detection of system activity, motherboard 302 is configured to selectively power off devices and components of computer 300 without disabling power to the single power plane. In various embodiments, power to the keyboard, video, and audio components, if present, of computer 300 are turned off. Peripheral devices on peripheral bus 111 such as peripheral device 115 instructed to enter power management mode. After all desired peripheral devices have been turned off, the low power sequence may disable clock generator 108 thereby killing the clock signal required to drive processor 104 and core chip set 106. Without a clock signal these devices will enter an powered off state in which they draw little if any current thereby greatly reducing the power consumed by computer 300 in low power mode. In one embodiment, power to system memory 112 is also disabled in low power mode resulting in the loss of information stored in system memory 112. In another embodiment, computer 300 maintains the contents of system memory 112 by continually refreshing system memory 112. It will be appreciated that embodiment of computer 300 in which data and instructions in system memory 112 are retained during low power mode will require significantly less time to recover than embodiments in which system memory 112 is permitted to dissipate.

Network interface 320, as shown in FIGS. 1 and 13 is coupled to processor 304 via peripheral bus 111. In a preferred embodiment, network interface 320 is integrated into motherboard 302 and is preferably configured to provide an Ethernet connection suitable for coupling computer 300 to a network medium. Preferably, network interface 320 includes a connector, such as an industry standard RJ45 connector (discussed in greater detail below) for receiving a cable (not shown) from another computer 301 (shown in FIG. 14) of computer network 303. In a wireless embodiment of network 303, interface 320 may include facilities for receiving and sending radio frequency signals to neighboring computers within network 303. Power to network interface 320 is preferably maintained even in low power mode to enable a wake up event from another computer in the computer network. In one embodiment, interface 320 recognizes a local area network (LAN) wake up event and responds by waking up or powering up the various components of computer 300. In one suitable embodiment, network interface 320 remains powered in low power mode and is further configured to detect a so called "magic packet" over the computer network. Typically, this magic packet comprises identification information unique to computer system 300. Upon detecting this magic packet or other LAN wake up event from another network computer, interface 320 is configured to issue an interrupt that results in rebooting computer 300.

Thus, the implementation of computer system 300 contemplates a method 330 depicted in the flow diagram of FIG. 12 for implementing low power mode in a network computer that includes only a single power plane in the computer's motherboard while retaining the ability to respond to a LAN wake up event. Method 330 simply includes a first step 332 in which network computer 300 enters a low power mode in response to an appropriate event such as the pushing of a button or the passage of a predefined time limit without detecting activity. The low power mode contemplated herein is achieved without disabling power to the single power plane in motherboard 302. Selected resources within computer 300 including network interface 320 remain powered to enable detection of a LAN wake up event, such as the presence of a magic packet or other similar such identification information by which a computer network informs a network computer 300 that it is being accessed. In other embodiments, computer system 300 may be further configured to wake up from a low power mode in response to external events other than LAN initiated wake up signals. In one embodiment, for example, a modem (not shown) that is coupled to computer 300 is configured to issue an interrupt in response to an incoming signal if computer 300 is in low power mode when the incoming signal is detected. Similarly, an embodiment is possible in which the pressing of on/off switch 317 when computer 300 is in low power mode results in a wake up of computer 300. In this embodiment, it will be appreciated that the on/off button does not actually terminate the supply of power to system 300 but, instead, selectively turns of power to various components and devices within computer 300.

Utilizing the single power plane power supply 350, and other cost saving reductions described in greater detail below, network computer 300 is preferably able to operate with a maximum operating power in full power mode of less than approximately 65 W, a low power mode maximum not exceeding approximately 15 W. In additional the physical dimensions of network computer 300, represented by reference indicators d1, d2, and d3 in FIG. 14, in a presently preferred embodiment include a maximum dimension of less than approximately 14 inches.

FIGS. 11 and 13 further indicates a characteristic of network computer 300, namely, the lack of a permanent local storage device such as the disk based storage medium almost universally associated with conventional computer systems. While the elimination of disk based permanent local storage from computer 300 provides a tremendous cost and power savings, it is nevertheless frequently desirable to include some form of permanent local storage in a "diskless" computer. Accordingly, one embodiment of network computer 300 implements local permanent storage, despite the lack of a disk based storage medium, through the use of compact flash cards discussed earlier. Such a flash card 116 is shown in FIG. 11 as suitable for being received in a connector 117 and interfaced with processor 104 and system memory 112. In this embodiment, it will be appreciated that flash card 116 includes circuits for carrying out the erase and programming functions. Compact flash cards 116 provide a mechanism for achieving low cost permanent local storage to computers in which disk devices have been eliminated.

An unfortunate difficulty associated with the elimination of disk devices from computers such as computer 300 is the scarcity of hardware verification software developed for and supported by operating systems that do not required the presence of a disk based medium. Without availability of commercially distributed test and verification software for diskless computers, significant development effort and cost is required to write code that will verify functionality of the various components of computer 300. To maintain the lowest possible cost in the design and manufacturing of network computers, the invention contemplates a network computer 300 configured with the capability to received a disk device such as a hard disk or floppy disk drive that would support commercially distributed disk based operating system such as OS/2, Windows 98®, and Windows NT® operating systems. Referring again briefly to the block diagram of computer 300 presented in FIG. 13, a disk device 322 is shown as being connected to computer 300 where the dashed line leading to disk 322 indicates that, in a preferred embodiment, disk 322 is temporarily installed. In this manner, the invention contemplates a method 340, depicted in the flow diagram of FIG. 15, of testing network computers such as network computer 300. In a first step 342, a disk based storage medium 322 is connected to computer 300, suitably through an appropriate peripheral bus 111. A disk based operating system is then loaded in step 344 and a commercially distributed test suite supported by the installed disk based operating system is then loaded and executed in step 346. After completing the verification of computer 300, disk based storage device 322 may be removed from computer 300, attached to a next network computer and used to verify functionality of the next computer. Thus, a plurality of network computers can be verified with a single or few disk based devices by temporarily installing the disk device in each of the computers under consideration. This method substantially eliminates the need and cost associated with developing test software compatible with operating systems designed for useless on diskless machines. In another variation, computer 300 may be modified to include disk device 322 as well as compact flash card 116. Using this approach, computer network 303 may be comprised of a diskless network computer 300 and a modified computer 301 that includes a disk device 322. In other embodiments, computer 301 of network 303 may include a more conventional computer including, for example, the multiple plane power supply configuration discussed above.

Figure 16:
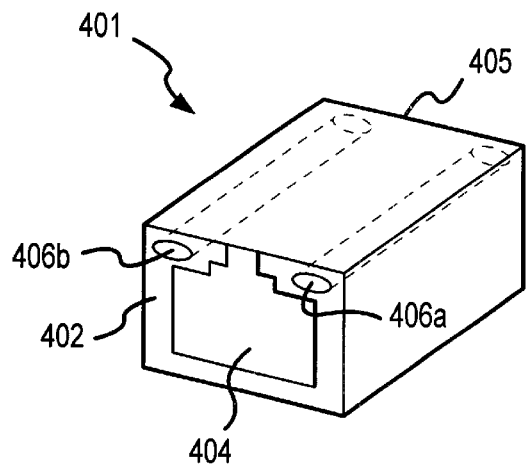
FIG. 16 is a perspective view of a connector according to a fifth application of the invention.
Figure 17:
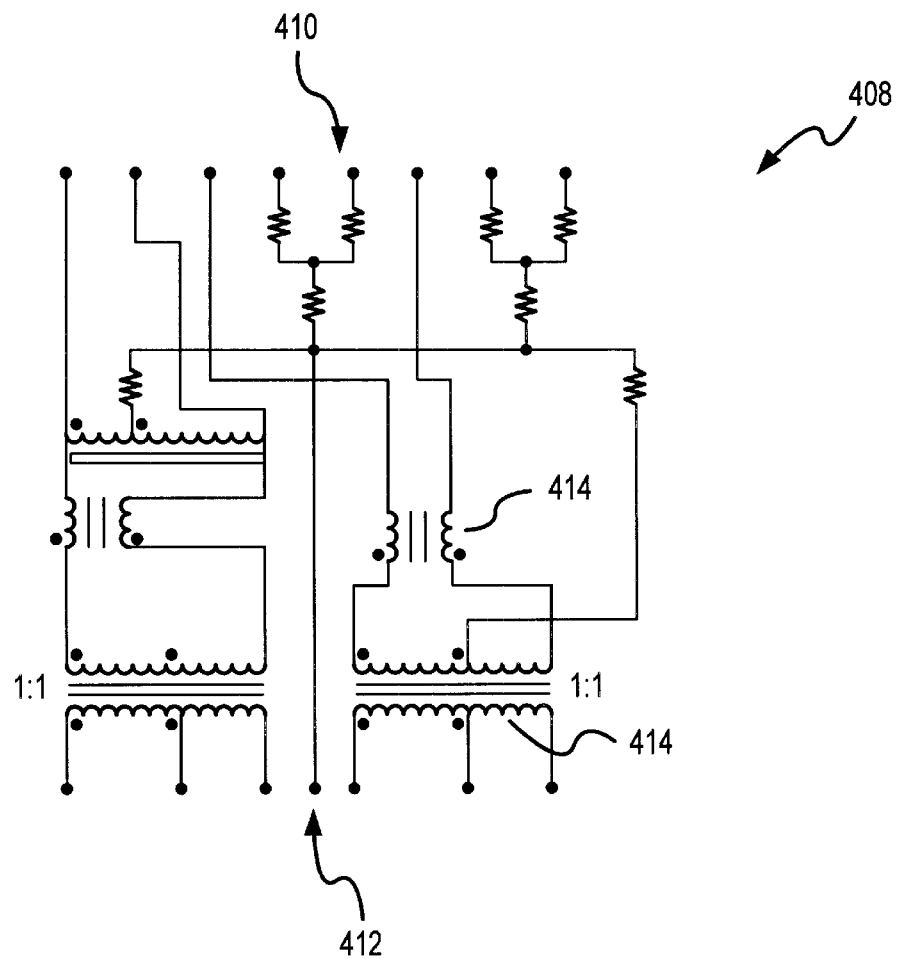
FIG. 17 is a circuit diagram of a representative circuit of the connector of FIG. 16.
Figure 18:
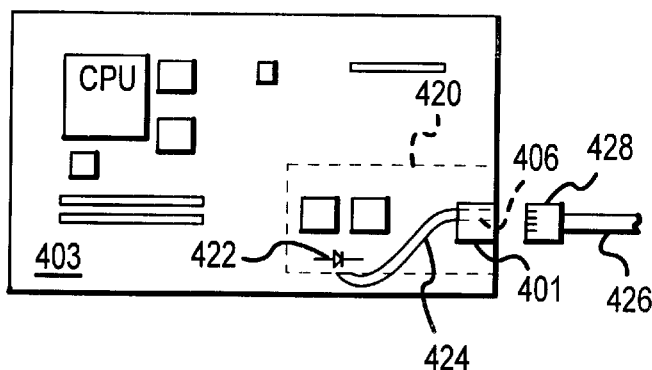
FIG. 18 is a simplified top view of a motherboard including a network interface according to a fifth application of the invention.

Turning now to FIGS. 16 through 19, an application of the present invention is presented that addresses EMI concerns caused by the proximity of LED leads to magnetic components of connectors designed for use in high speed networks. FIG. 16 depicts a connector 401 designed for use in coupling a network cable to an interface card. Connector 401 includes a housing 405 having a receptacle face 402. In the preferred embodiment, housing 405 is comprised of a conductive material such as aluminum to shield circuitry contained within housing 405. In embodiments of connector 401 for use in network computers and other smaller profile computers, a maximum dimension of housing 405 is preferably less than approximately 0.8 inches. Housing 405 includes a receptacle face 402 that defines a receptacle opening 404 configured to received a cable terminus 428 (shown in FIG. 18). Within housing 405, a receptacle (not explicitly shown) suitable for coupling to cable terminus 428 is attached to an interior surface of housing 405. Further included in connector 401 is a connector circuit, a suitable example of which is depicted in the circuit diagram of FIG. 17. Connector circuit 408, as contemplated in the invention, includes a cable port 410, an interface port 412, and magnetic components 414. Connector 401 and circuit 408 are representative of an RJ45 industry standard connector for providing an Ethernet connection commonly encountered in a wide range of computer network implementations. FIG. 18 depicts connector 401 integrated into a network interface 420 of a motherboard 403. Because it is frequently desirable to provide a simple and effective means of indicating network status, connectors according to the prior art commonly incorporate one or more light emitting diodes (LEDs) within the connector. These LEDs are typically coupled to network interface to indicate network activity or other characteristics of the network. Unfortunately, in high speed networks where information is transferred at rates approaching and exceeding 100 megabits/second, the proximity of the LED lead wires to magnetic components of the connector's circuit can result in intolerably high EMI effects that can reduce the reliability or functionality of the computer network.

Figure 19:
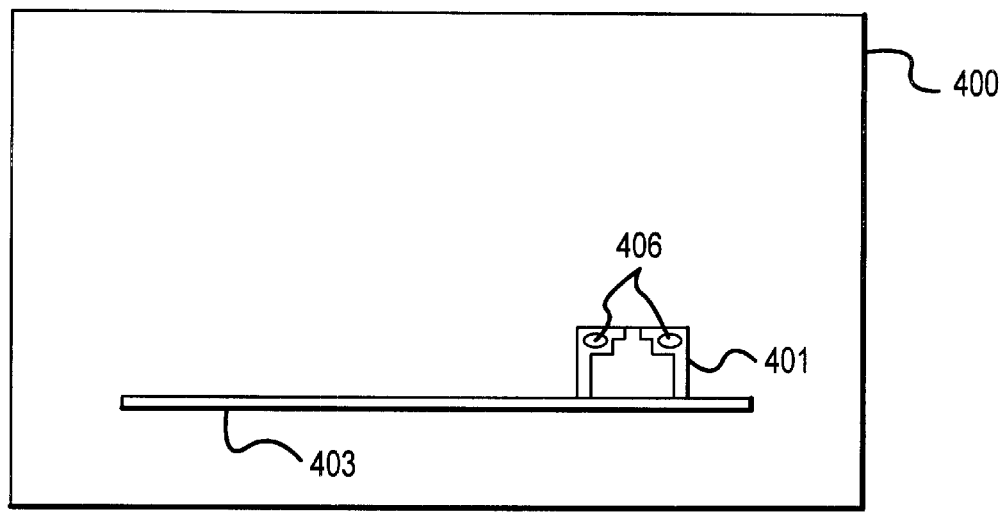
FIG. 19 is a simplified view of a computer including a network interface according to the fifth application of the invention.

The application of the invention disclosed in FIGS. 16 through 19 addresses the EMI issues associated with the use of RJ45 and other magnetic connectors with LEDs in high speed networks by proposing a mechanism to displace the LEDs from the proximity of the magnetics of connector circuit 408 and from connector 401 entirely. Returning to FIG. 16, housing 405 of connector 401 is shown as including at least one conduit 406 (two of which, first conduit 406a and second conduit 406b are depicted). Each conduit 406 extends through housing 405 and terminates on receptacle face 402 of housing 405 and is suitably configured to receive a light pipe. FIG. 18 discloses a top view of a motherboard 403 including an integrated network interface 420. Network interface 420 includes connector 401 attached to motherboard 402 along with a status LED 422 that is configured to indicate status of network interface 420. Status LED 422 is physically displaced from connector 401 and the magnetic circuitry 414 incorporated therein. Network interface 420 further includes a light pipe 424 that is received within a conduit 406 of connector 401 such that a first end of light pipe 424 terminates at receptacle face 402 of connector 401 proximal to receptacle opening 404. A second end of light pipe 424 terminates in the proximity of LED 422. With this configuration, light emitting from LED 422 will travel the length of light pipe 424 and terminate at receptacle face 402 of housing 405 where the interface status will be readily apparent to an observer. FIG. 19 discloses a computer system 400 that includes connector 401 attached to a motherboard 403 complete with status indicator conduits 406 as discussed above.

It will be apparent to those skilled in the art having the benefit of this disclosure that the present invention contemplates various improvements to computers such as network computers. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A network computer comprising:

a chassis;

a power supply affixed to an interior surface of said chassis;

a motherboard powered by said power supply, said motherboard including a clock generator, a boot code storage device, a processor, and a system memory;

a network interface coupled to said processor via a peripheral bus and suitable for interfacing said network computer to a server computer via a network;

wherein said network computer lacks a disk drive unit, but includes local permanent storage and disk drive facilities for receiving a disk drive unit, wherein a disk drive unit may be temporarily installed in said network computer to enable said network computer to execute a disk-based operating system;

at least one peripheral device attached to a peripheral bus of said network computer, wherein said motherboard is powered by said power supply via a single power supply plane and wherein said motherboard is configured to power off said peripheral device, in response to a low power event, without terminating power on the single power supply plane.

2. The computer of claim 1, wherein said network interface includes an RJ45 connector and provides an Ethernet connection.

3. The computer of claim 1, wherein said power supply powers said motherboard via a single power plane.

4. The computer of claim 1, wherein said network computer consumes less than approximately 250 watts.

5. The computer of claim 1, wherein said local permanent storage consists of a compact flash card.

6. The computer of claim 1, wherein said boot code storage device comprises a flash memory device.

7. A computer network, comprising:

at least one network computer comprised of a chassis, a power supply affixed to an interior surface of said chassis, a motherboard powered by said power supply, and a network interface integrated in said motherboard and suitable for interfacing said network computer to a server computer via a network medium, wherein said network computer lacks a disk-based storage device, but includes local permanent storage comprising a compact flash device and disk drive facilities for receiving a disk drive unit, wherein a disk drive unit may be installed temporarily in said network computer to enable said network computer to execute a disk-based operating system; and a server computer interfaced to said network computer via said network medium, wherein said server computer includes a chassis, a power supply attached to an interior of said server computer chassis, a motherboard, and local permanent storage including a disk-based storage device;

wherein said network computer motherboard is powered by said power supply via a single power supply plane and wherein said motherboard is configured to power off a peripheral device attached to a peripheral bus of said network computer, in response to a low power event, without terminating power on the single power supply plane.

8. The network of claim 7, wherein said network computer consumes less than approximately 250 watts of power.

9. The network of claim 7, wherein said network interface provides for an Ethernet connection.

10. The network of claim 7, wherein said network medium comprises cable.

11. The network of claim 7, wherein said network comprises a wireless network whereby said network medium comprises atmosphere.

12. The network of claim 7, wherein said local permanent storage of said server computer further includes a compact flash card.

* * * * *